(12) United States Patent
Kasahara

(10) Patent No.: US 11,695,893 B2
(45) Date of Patent: Jul. 4, 2023

(54) IMAGE FORMING APPARATUS AND METHOD OF CONTROLLING IMAGE FORMING APPARATUS

(71) Applicant: CANON KABUSHIKI KAISHA, Tokyo (JP)

(72) Inventor: Aya Kasahara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/497,741

(22) Filed: Oct. 8, 2021

(65) Prior Publication Data
US 2022/0124222 A1    Apr. 21, 2022

(30) Foreign Application Priority Data
Oct. 19, 2020   (JP) .............................. JP2020-175296

(51) Int. Cl.
*H04N 1/60* (2006.01)
*G03G 15/00* (2006.01)

(52) U.S. Cl.
CPC ....... *H04N 1/6033* (2013.01); *G03G 15/5025* (2013.01); *G03G 15/5041* (2013.01); *G03G 15/5058* (2013.01); *G03G 15/5062* (2013.01)

(58) Field of Classification Search
CPC ............. H04N 1/6033; G03G 15/5025; G03G 15/5041; G03G 15/5058; G03G 15/5062
USPC .................................................. 358/1.9, 1.15
See application file for complete search history.

(56) References Cited

U.S. PATENT DOCUMENTS

2014/0255051 A1\* 9/2014 Itagaki ............... G03G 15/5062
399/49
2015/0153985 A1\* 6/2015 Fujinaga ............... G06F 3/1203
358/1.15

FOREIGN PATENT DOCUMENTS

JP          2010122377 A      6/2010

\* cited by examiner

*Primary Examiner* — Quang N Vo
(74) *Attorney, Agent, or Firm* — Canon U.S.A., Inc. I.P. Division

(57) ABSTRACT

An image forming apparatus including a plurality of sheet feeding cassettes includes a control unit. The control unit performs control. In a case where a predetermined condition is satisfied during execution of a print job to print image data, the control unit performs control to execute interruption processing of a correction job to print a correction patch. The control unit performs control to determine, from the plurality of sheet feeding cassettes, a sheet feeding cassette to be used for the correction job based on information on the sheet feeding cassette used for the print job.

18 Claims, 16 Drawing Sheets

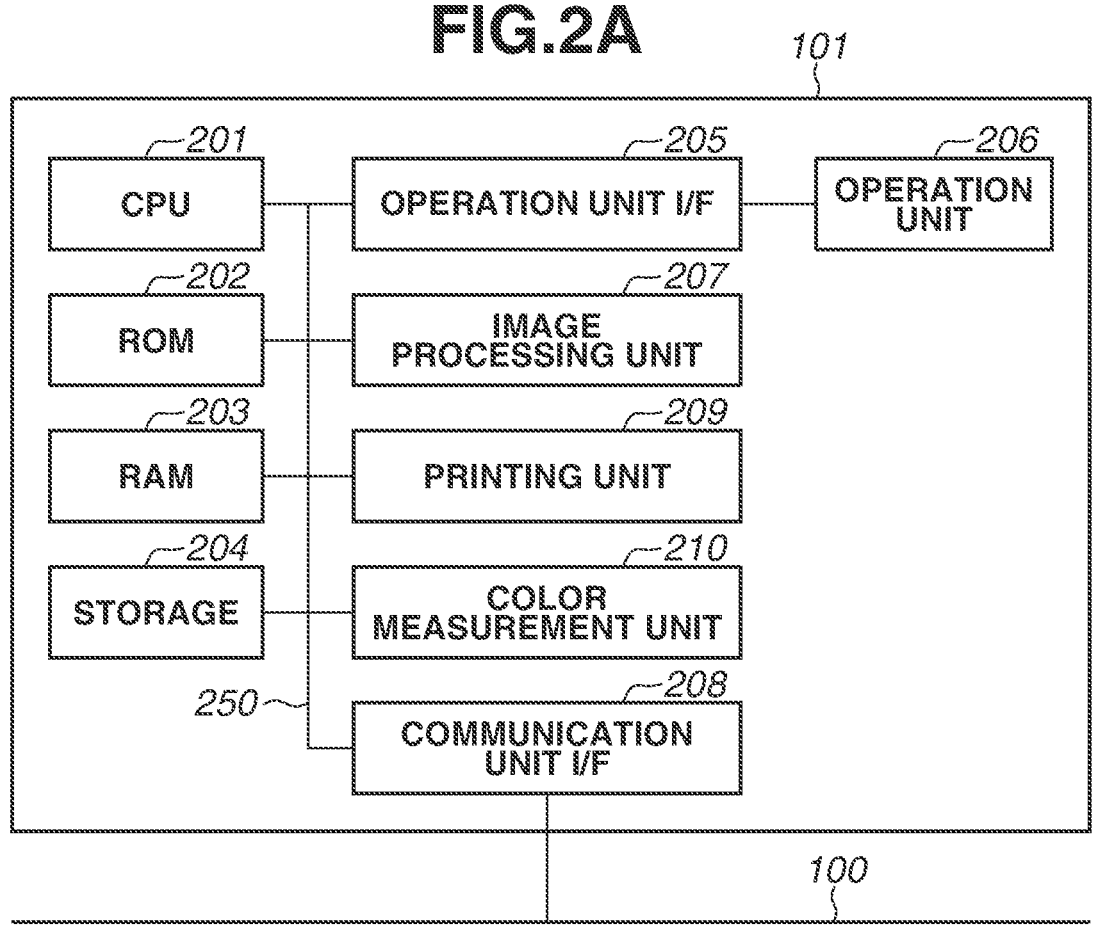
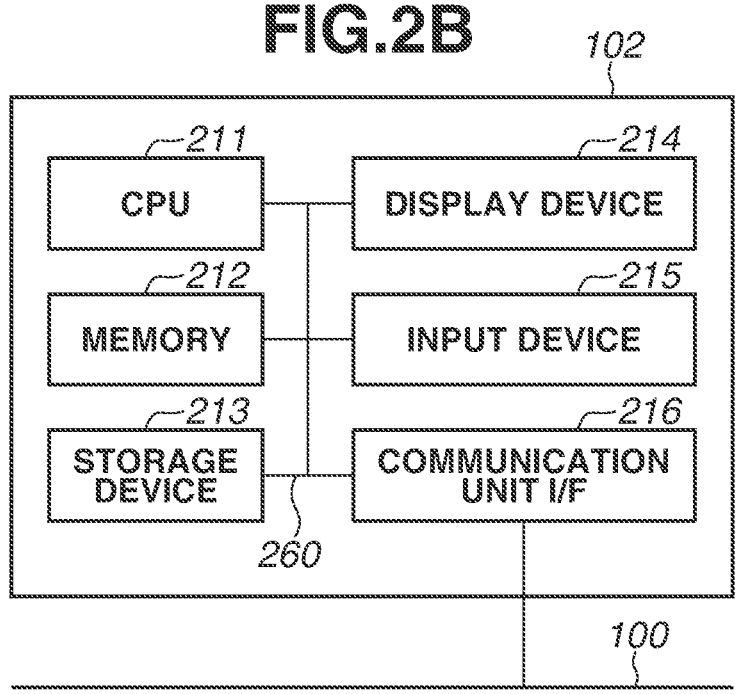

FIG.5C

Reference value (571):

| TEMPERATURE | 100 | 90 | 80 | 70 | 60 | 50 | 40 | 30 | 20 | 10 |
|---|---|---|---|---|---|---|---|---|---|---|
| C | 1022 | 922 | 819 | 717 | 617 | 512 | 405 | 307 | 205 | 102 |
| M | 1020 | 923 | 820 | 717 | 615 | 513 | 412 | 309 | 210 | 103 |
| Y | 1016 | 921 | 819 | 717 | 614 | 512 | 410 | 305 | 205 | 99 |
| K | 1023 | 920 | 820 | 713 | 611 | 510 | 408 | 307 | 207 | 100 |

Measurement value (572):

| TEMPERATURE | 100 | 90 | 80 | 70 | 60 | 50 | 40 | 30 | 20 | 10 |
|---|---|---|---|---|---|---|---|---|---|---|
| C | 1018 | 921 | 822 | 719 | 620 | 520 | 401 | 307 | 203 | 100 |
| M | 1010 | 920 | 815 | 723 | 615 | 523 | 422 | 311 | 214 | 100 |
| Y | 1015 | 923 | 824 | 710 | 619 | 512 | 411 | 309 | 207 | 110 |
| K | 1020 | 915 | 815 | 700 | 601 | 512 | 405 | 302 | 205 | 95 |

Correction value (573):

| TEMPERATURE | 100 | 90 | 80 | 70 | 60 | 50 | 40 | 30 | 20 | 10 |
|---|---|---|---|---|---|---|---|---|---|---|
| C | 4 | 1 | -3 | -2 | -3 | -8 | 4 | 0 | 2 | 10 |
| M | 10 | 3 | 5 | -6 | 0 | -10 | -10 | -2 | 2 | 2 |
| Y | 11 | -2 | -5 | 7 | -5 | 0 | -1 | -4 | -2 | 3 |
| K | 3 | 5 | 5 | 13 | 10 | -2 | 3 | 5 | 2 | 5 |

FIG.5D

| 581 | 582 | 583 | 584 | 585 | 586 |
|---|---|---|---|---|---|
| SHEET TYPE | TARGET SHEET FEEDING CASSETTE | REFERENCE VALUE (1/2-SPEED) | REFERENCE VALUE (1/1-SPEED) | GENERATION PAGE ID | TIMESTAMP |
| REGULAR PAPER 3 | CST1 | NULL | PRESENT TBL 571 | 60014 | 2019/07/18 10:04:06 |
| | | | | | |

FIG.5E

| 591 | 592 | 593 | 594 | 595 | 596 |
|---|---|---|---|---|---|
| SHEET TYPE | TARGET SHEET FEEDING CASSETTE | CORRECTION VALUE (1/2-SPEED) | CORRECTION VALUE (1/1-SPEED) | GENERATION PAGE ID | TIMESTAMP |
| REGULAR PAPER 3 | CST1 | NULL | PRESENT TBL 573 | 640015 | 2019/07/18 18:34:21 |
| | | | | | |

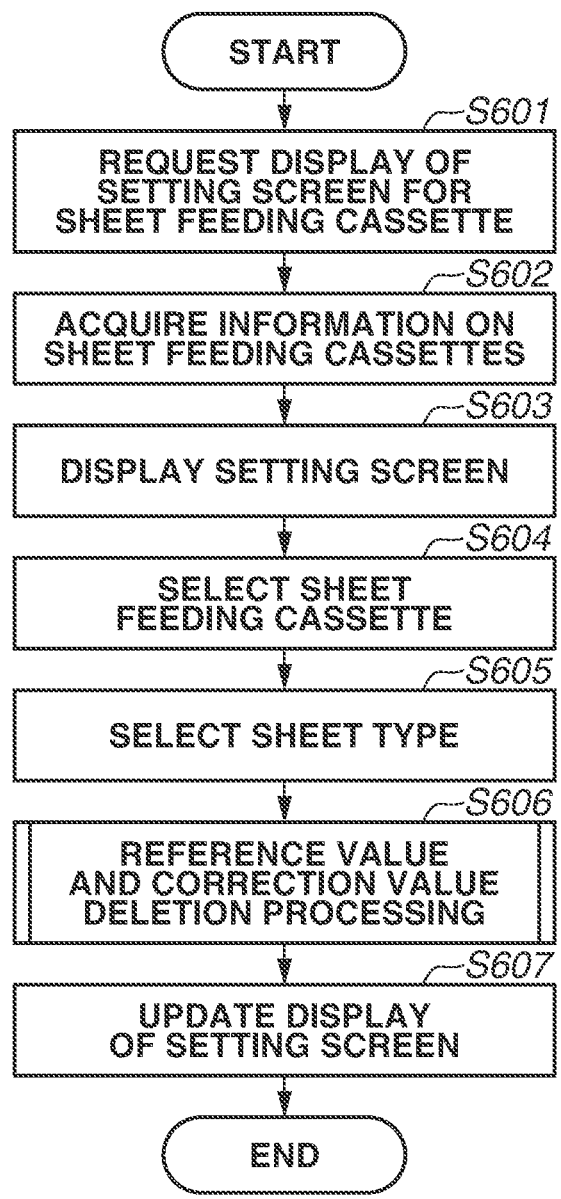

FIG.13

|   | SHEET FEEDING CASSETTE | SHEET TYPE |
|---|---|---|
| 0 | CST1 | REGULAR PAPER 3 |
| 1 | CST4 | COATED PAPER 1 |
| 2 |  |  |

IMAGE FORMING APPARATUS AND METHOD OF CONTROLLING IMAGE FORMING APPARATUS

BACKGROUND

Field

The present disclosure relates to an image forming apparatus and a method of controlling the image forming apparatus.

Description of the Related Art

A printing system in which an inline sensor is provided in a rear stage of a printing apparatus forming an image on a sheet and the inline sensor reads the image on the sheet formed by the printing apparatus has been known. Such a printing system adjusts image quality and the like in such a manner that, while a print job is processed, the printing apparatus prints patches at a predetermined timing, and the inline sensor reads the patches, in some cases. Japanese Patent Application Laid-Open No. 2010-122377 discusses a method in which setting of a sheet feeding cassette and a variation range of density allowed for an output product to be printed using sheets from the sheet feeding cassette is received from a user, an interval to insert a patch-printed sheet is determined based on the setting, and density is controlled so as not to exceed the variation range.

In the method discussed in Japanese Patent Application Laid-Open No. 2010-122377, however, the setting cannot be performed in consideration of a print job. In a case where a sheet used for the print job and a sheet used for printing of the patches are different from each other, it is necessary to change the sheet feeding cassette, a printing condition, etc. while the print job is processed. Therefore, continuity of the processing may be lost and productivity may be deteriorated. In addition, in a case where image quality, etc. are adjusted by using a sheet of a type different from a type of the sheet used for the print job, quality of the output product may be deteriorated.

SUMMARY

An example image forming apparatus disclosed herein is directed to a technique that secures quality of an output product generated by an image forming apparatus while reducing deterioration in productivity.

According to an aspect of the present disclosure, an image forming apparatus including a plurality of sheet feeding cassettes includes a control unit configured to perform control, wherein, in a case where a predetermined condition is satisfied during execution of a print job to print image data, the control unit performs control to execute interruption processing of a correction job to print a correction patch, and wherein the control unit performs control to determine, from the plurality of sheet feeding cassettes, a sheet feeding cassette to be used for the correction job based on information on the sheet feeding cassette used for the print job.

Further features of the present disclosure will become apparent from the following description of exemplary embodiments with reference to the attached drawings.

BRIEF DESCRIPTION OF THE DRAWINGS

FIG. 2A is a diagram illustrating a hardware configuration example of an image forming apparatus.

FIG. 2B is a diagram illustrating a hardware configuration example of an information processing apparatus.

FIG. 5C is a diagram illustrating examples of a reference value, a measurement value, and a correction value.

FIG. 5D is a diagram illustrating an example of a reference value management table.

FIG. 5E is a diagram illustrating an example of a correction value management table.

FIG. 6 is a flowchart illustrating sheet replacement processing.

FIG. 13 is a diagram illustrating an example of a registration list.

DESCRIPTION OF THE EMBODIMENTS

Exemplary embodiments of the present disclosure will be described below with reference to the attached drawings.

Figure 1:
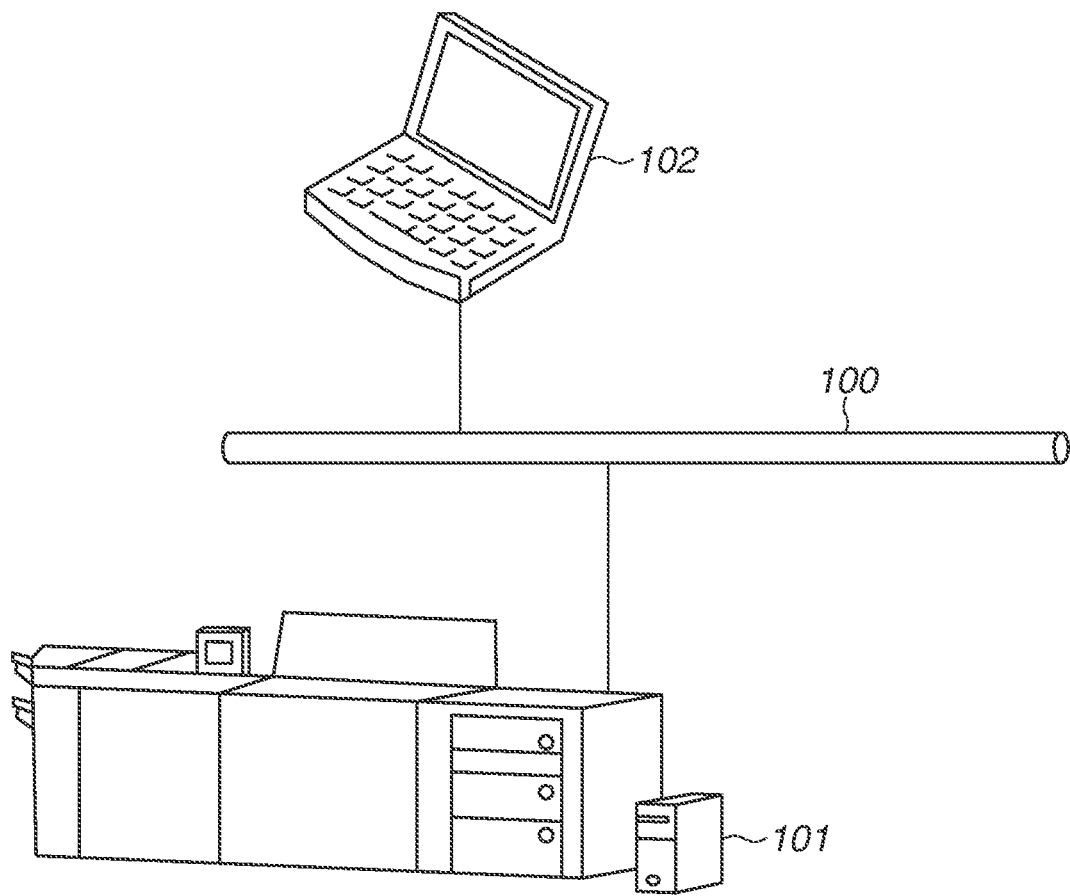
FIG. 1 is a diagram illustrating a configuration example of a printing system.

FIG. 1 is a diagram illustrating a configuration example of a printing system according to a first exemplary embodiment. As illustrated in FIG. 1, the printing system includes a printing apparatus 101 and an information processing apparatus 102. The printing apparatus 101 and the information processing apparatus 102 each has a communication function, and are connected to a network 100 such as a wireless or wired local area network (LAN). Print data received from the information processing apparatus 102 can be printed by the printing apparatus 101. During execution of a print job to print the print data, the printing apparatus 101 performs interruption processing of a correction job to print correction gradation patches, and performs correction processing using a result obtained by measuring colors of the printed gradation patches. Further, the printing apparatus 101 includes a plurality of sheet feeding cassettes in which sheets can be set.

In the first exemplary embodiment, a form in which the printing apparatus 101 prints the gradation patches on a sheet fed from a sheet feeding cassette used for a page being printed immediately before the interruption processing, is described.

FIG. 2A is a diagram illustrating a hardware configuration example of the printing apparatus 101 according to the present exemplary embodiment. The printing apparatus 101 has a function to form an image on a sheet. In the present exemplary embodiment, the printing apparatus 101 is described as an example of an image forming apparatus; however, the image forming apparatus may be, for example, a multifunctional peripheral (MFP) further having a scanner function and a facsimile (FAX) function. The printing apparatus 101 includes a central processing unit (CPU) 201, a read only memory (ROM) 202, a random access memory (RAM) 203, a storage 204, an operation unit interface (I/F) 205, an operation unit 206, an image processing unit 207, a communication unit I/F 208, a printing unit 209, and a color measurement unit 210. These units are connected to one another through a bus 250.

The CPU 201 controls the whole of the printing apparatus 101. The CPU 201 loads programs stored in the ROM 202 or the storage 204 into the RAM 203, and executes the programs. As a result, various kinds of functions and processing illustrated in flowcharts described below are realized. The ROM 202 stores, in addition to control programs and various kinds of programs that can be executed by the CPU 201, a reference value management table and a correction value management table described below, and the like. The RAM 203 is a main storage memory of the CPU 201. The RAM 203 temporarily stores various kinds of data described below such as a reference value and a correction value, and is used as a work area or a temporary storage area for loading the programs. The storage 204 stores control programs, various kinds of programs, setting information, print data, data on gradation patches, etc. In the present exemplary embodiment, an auxiliary storage device such as a hard disk drive (HDD) is used as the storage 204; however, a nonvolatile memory such as a solid state drive (SSD) may be used as the storage 204.

In the printing apparatus 101 according to the present exemplary embodiment, one CPU 201 performs processing illustrated in the flowcharts described below by using one memory (RAM 203); however, other forms may be adopted. For example, the printing apparatus 101 may cause a plurality of CPUs, RAMs, ROMs, and storages to cooperate with one another to perform the processing illustrated in the flowcharts described below. Further, the printing apparatus 101 may perform a part of the processing by using a hardware circuit such as an application specific integrated circuit (ASIC) and a field-programmable gate array (FPGA).

The operation unit I/F 205 is an interface to connect the operation unit 206 and the CPU 201. The operation unit 206 includes a touch panel and various kinds of hardware keys, and has a display function to display information and an input function to receive input by a user.

The image processing unit 207 has a raster image processor (RIP) function to convert print data received through the communication unit I/F 208, into printable image data. Further, the image processing unit 207 can perform resolution conversion and correction processing on the image data under the control of the CPU 201. In the present exemplary embodiment, it is assumed that the image processing unit 207 is realized by a hardware circuit (such as ASIC and FPGA); however, the image processing unit 207 is not limited thereto, and other configurations may be adopted. For example, the printing apparatus 101 may include a processor for image processing as the image processing unit 207, and the processor may execute an image processing program to perform the above-described image processing. In this case, the processor and the CPU 201 cooperate with each other to perform the processing illustrated in the flowcharts described below. Furthermore, the CPU 201 may function as the image processing unit 207 and perform the above-described image processing. Alternatively, any of these configurations may be combined to perform the above-described image processing.

The printing unit (printer engine) 209 prints an image on a sheet fed from the sheet feeding cassette based on the image data generated by the image processing unit 207 under the control of the CPU 201. In the present exemplary embodiment, a printing method of the printing unit 209 is an electrophotographic method; however, the printing method is not limited thereto, and may be other methods such as an inkjet method and a heat transfer method.

The color measurement unit 210 is a device measuring colors of the image printed on the sheet, and is disposed on a downstream of the printing unit 209 in a conveyance direction. The color measurement unit 210 is a device reading the image formed on a recording medium by the printing unit 209, and is, for example, an inline sensor. As the color measurement unit 210, a contact image sensor (CIS) can be used; however, the color measurement unit 210 is not limited thereto as long as the color measurement unit 210 can measure colors of the image on the sheet. In the present exemplary embodiment, an inline sensor is used as the color measurement unit 210. The inline sensor measures density of the gradation patches printed on the sheet and provides a result of the measurement as color measurement data to the CPU 201 under the control of the CPU 201.

The CPU 201 is connected to the network 100 through the communication unit I/F 208. The CPU 201 receives a print request (print data) from the information processing apparatus 102 on the network 100 through the communication unit I/F 208.

FIG. 2B is a diagram illustrating a hardware configuration example of the information processing apparatus 102 according to the present exemplary embodiment. The information processing apparatus 102 is, for example, a personal computer. The information processing apparatus 102 includes a CPU 211, a memory 212, a storage device 213, a display device 214, an input device 215, and a communication unit I/F 216. These units are connected to one another through a bus 260.

The CPU 211 executes programs stored in the storage device 213 to perform various kinds of functions described below. The memory 212 temporarily stores programs and data read out from the storage device 213 by the CPU 211. The storage device 213 stores programs such as an operating system (OS) and a printer driver, data, etc. The display device 214 displays setting contents, etc. necessary for printing. The input device 215 includes a keyboard and a mouse, and receives input from the user. The CPU 211 is connected to the network 100 via the communication unit I/F 216. The CPU 211 transmits the print request (print data) to the printing apparatus 101 on the network 100 via the communication unit I/F 216.

Figure 3:
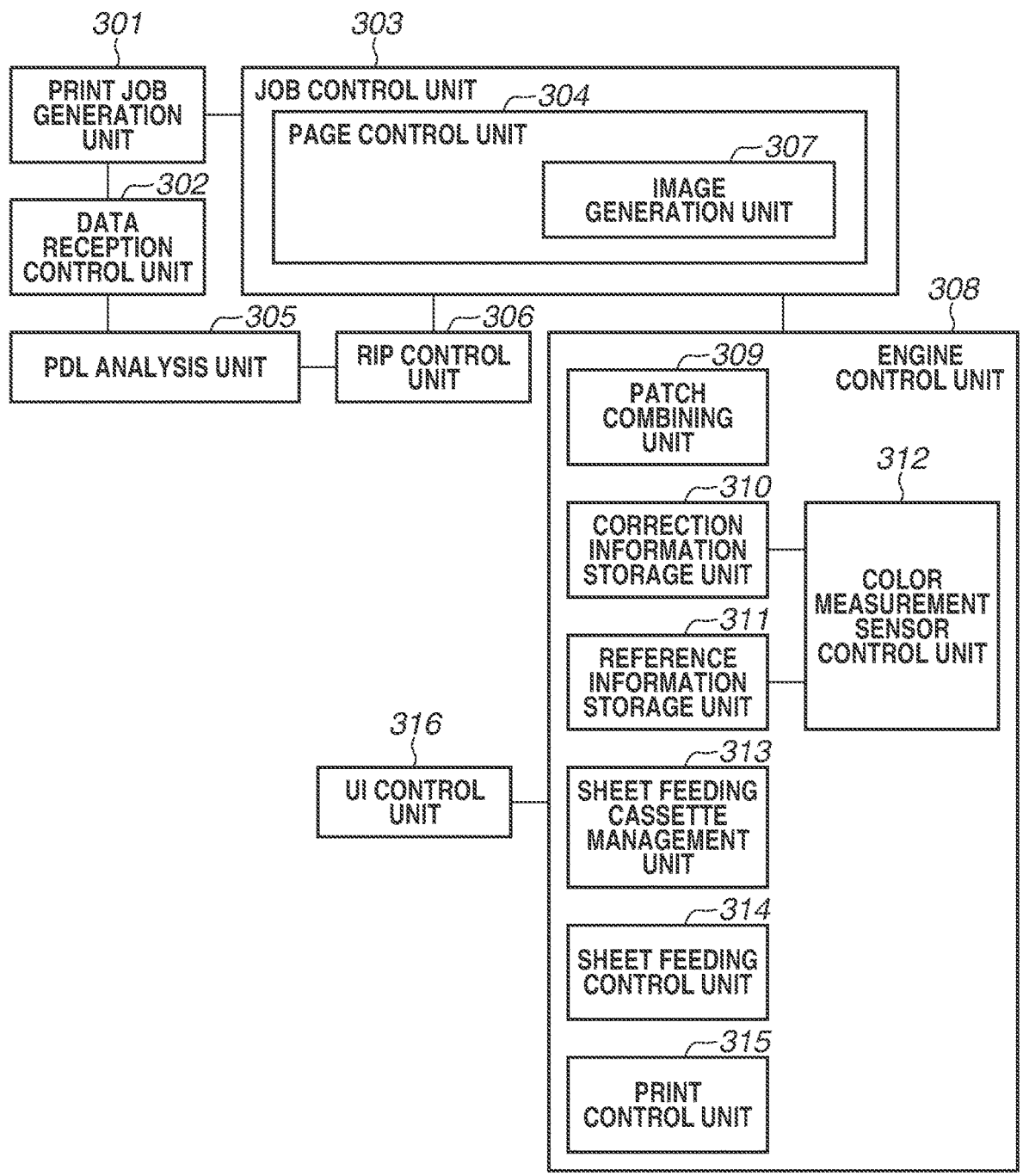
FIG. 3 is a diagram illustrating a functional configuration example of the image forming apparatus.

FIG. 3 is a diagram illustrating a functional configuration example of the printing apparatus 101 according to the present exemplary embodiment. When the CPU 201 reads out and executes the programs stored in the ROM 202 or the storage 204, the printing apparatus 101 functions as the functional units illustrated in FIG. 3.

When a data reception control unit 302 receives page description language (PDL) data (print data), a print job generation unit 301 generates a print job. A job control unit 303 registers the generated print job and controls registered print jobs to be sequentially performed. The job control unit 303 instructs a page control unit 304 to start print processing of all of pages included in the registered print job in order from the first page. The page control unit 304 performs the print processing sequentially on the pages in response to the instruction to start the print processing from the job control unit 303. After the print processing on all of the pages included in the print job is completed, the job control unit 303 notifies the print job generation unit 301 of completion of the job.

The data reception control unit 302 receives the PDL data (print data) transmitted from the information processing apparatus 102 via the communication unit I/F 208. A PDL analysis unit 305 analyzes the received PDL data and converts the received PDL data into intermediate data. An RIP control unit 306 controls the image processing unit 207 to perform rasterizing processing on the converted intermediate data to generate image data in a bitmap format. An image generation unit 307 performs correction processing on the generated image data in the bitmap format. More specifically, the image generation unit 307 generates a corrected print image by reflecting a correction value stored in a correction information storage unit 310 on the image data. Thereafter, the image generation unit 307 provides the corrected print image to a patch combining unit 309 of an engine control unit 308 in order to print gradation patches on the margin of a sheet.

The engine control unit 308 includes the patch combining unit 309, the correction information storage unit 310, a reference information storage unit 311, a color measurement sensor control unit 312, a sheet feeding cassette management unit 313, a sheet feeding control unit 314, and a print control unit 315. The patch combining unit 309 combines gradation patches with the corrected print image received from the image generation unit 307. Thereafter, the patch combining unit 309 instructs the print control unit 315 to print the combined image. The sheet feeding control unit 314 controls the sheet feeding cassette corresponding to the instruction of the print job, to convey and feed a sheet set in the sheet feeding cassette. The print control unit 315 prints the combined image on the sheet fed from the sheet feeding control unit 314, and discharges the sheet.

The color measurement sensor control unit 312 controls the color measurement unit 210. More specifically, the color measurement sensor control unit 312 controls the color measurement unit 210 to measure colors of the gradation patches printed on the sheet, and acquires color measurement data. The reference information storage unit 311 stores a reference value, for each sheet type, generated based on the color measurement data acquired by the color measurement sensor control unit 312. The correction information storage unit 310 stores a correction value, for each sheet type, determined by comparison between the reference value stored in the reference information storage unit 311 and a measurement value generated based on the color measurement data acquired by the color measurement sensor control unit 312.

The sheet feeding cassette management unit 313 manages types of sheets set in the respective sheet feeding cassettes. More specifically, the sheet feeding cassette management unit 313 deletes a reference value for the sheet type to be removed for replacement among the reference values stored in the reference information storage unit 311, in response to a sheet registration request from a user interface (UI) control unit 316. In a case where the correction information storage unit 310 stores a correction value for the sheet type to be removed for replacement, the sheet feeding cassette management unit 313 also deletes the correction value. When receiving, from the operation unit 206, a sheet replacement instruction to replace sheets in the sheet feeding cassette, the UI control unit 316 issues the sheet registration request to the sheet feeding cassette management unit 313.

A setting screen for image adjustment is described with reference to FIGS. 4A and 4B. In the present exemplary embodiment, the CPU 201 of the printing apparatus 101 performs interruption processing of a correction job to print the gradation patches during execution of the print job, and reflects the correction value obtained by using the color measurement data on the gradation patches, on print processing of the subsequent pages in real time. Such a function is referred to as a real-time multi-gradation correction function. The real-time multi-gradation correction function reduces gradation variation in the print job. The real-time multi-gradation correction function has two types that are a margin utilization type in which gradation patches are printed on the sheet margin of each page to perform correction processing and a chart insertion type in which a sheet on which only gradation patches are printed (hereinafter, referred to as chart) is inserted at a predetermined interval to perform correction processing. The chart insertion type is effective for a case where the sheet margin cannot be used. Which one of the margin utilization type and the chart insertion type is to be used is determined based on the setting contents set to the printing apparatus 101 by the information processing apparatus 102. In the present exemplary embodiment, the correction job is a job for printing only the gradation patches, so that control contents for the chart insertion type are described, and description of control contents for the margin utilization type is omitted.

Figure 4A:
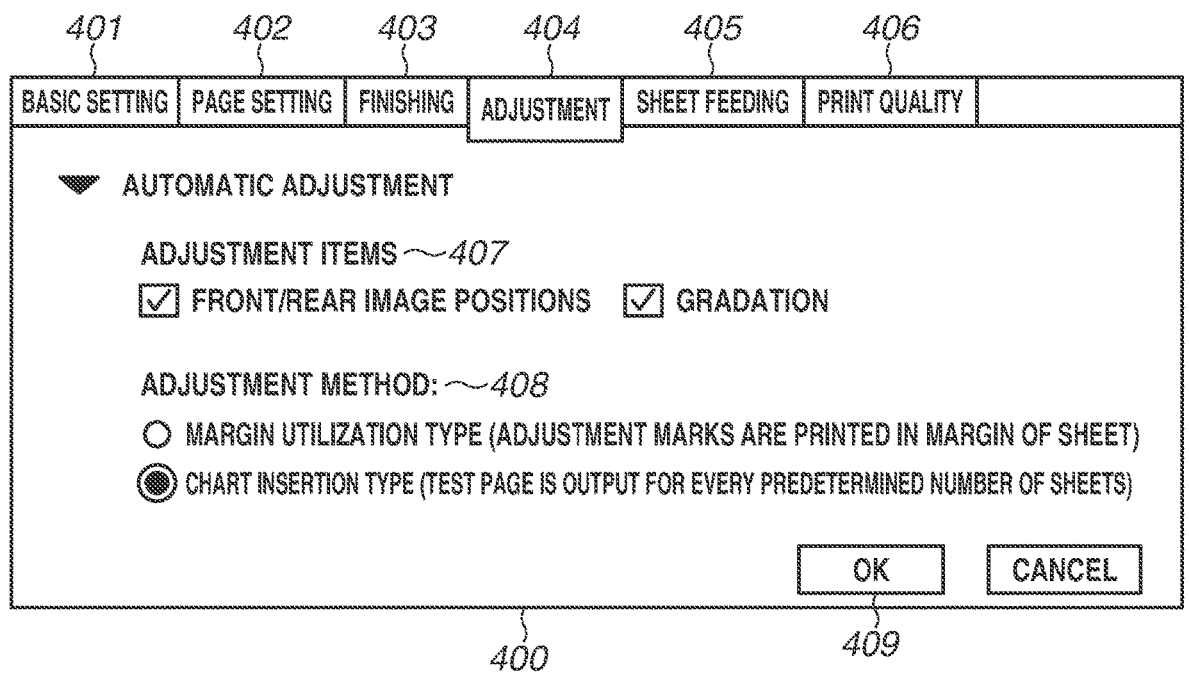
FIGS. 4A and 4B are diagrams each illustrating an example of a setting screen.

FIG. 4A is a diagram illustrating an example of a setting screen displayed on the display device 214 of the information processing apparatus 102. The CPU 211 of the information processing apparatus 102 executes programs stored in the storage device 213 to display a setting screen 400 on the display device 214. The CPU 211 of the information processing apparatus 102 receives input of setting contents for the printing apparatus 101 via the setting screen 400. The setting screen 400 includes tabs 401 to 406 corresponding to the setting contents, and a tab selected by the user is displayed.

An adjustment tab 404 is displayed on the setting screen 400 in FIG. 4A. The adjustment tab 404 includes an adjustment item setting field 407 and an adjustment method setting field 408.

The adjustment item setting field 407 is a display field for setting of adjustment items to be adjusted by the printing apparatus 101 by using the color measurement unit 210. Here, an example is given in which, as the adjustment item setting field 407, checkboxes of "front/rear image positions" and "gradation" are displayed as selectable options, and both of the "front/rear image positions" and the "gradation" are selected by the user. The adjustment items selected in the adjustment item setting field 407 are set as the adjustment items for the printing apparatus 101, and adjustment is performed based on the adjustment items. The item "gradation" indicates the above-described real-time multi-gradation correction function. The item "front/rear image positions" indicates a front/rear registration adjustment function to adjust positions of images printed on front and rear surfaces of the sheet. A detailed description of the "front/rear image positions" is omitted.

The adjustment method setting field 408 is a display field for setting an adjustment method for the adjustment items selected in the adjustment item setting field 407. Here, an example is given in which radio buttons of a "margin utilization type" and a "chart insertion type" are displayed as selectable options in the adjustment method setting field 408, and the "chart insertion type" is selected by the user.

Other tabs than the above-described adjustment tab 404 displayed in the example of FIG. 4A are a basic setting tab 401, a page setting tab 402, a finishing tab 403, a sheet feeding tab 405, and a print quality tab 406. The basic setting tab 401 is used to perform basic setting such as the number of copies, a printing direction, a magnification, and an output method. The page setting tab 402 is used to perform setting of page layout, magnification, and the like of the image. The finishing tab 403 is used to perform setting of single-sided/double-sided printing, setting of a binding direction, and setting of a discharge method. The sheet feeding tab 405 is used to perform setting of a sheet feeding cassette from which sheets are fed. The print quality tab 406 is used to perform setting related to image quality such as a color mode (color/monochrome) and resolution. When an OK button 409 provided in the setting screen 400 is pressed, the CPU 211 of the information processing apparatus 102 transmits the setting contents input in the tabs 401 to 406 and the print request to the printing apparatus 101 via the communication unit I/F 216.

Figure 4B:
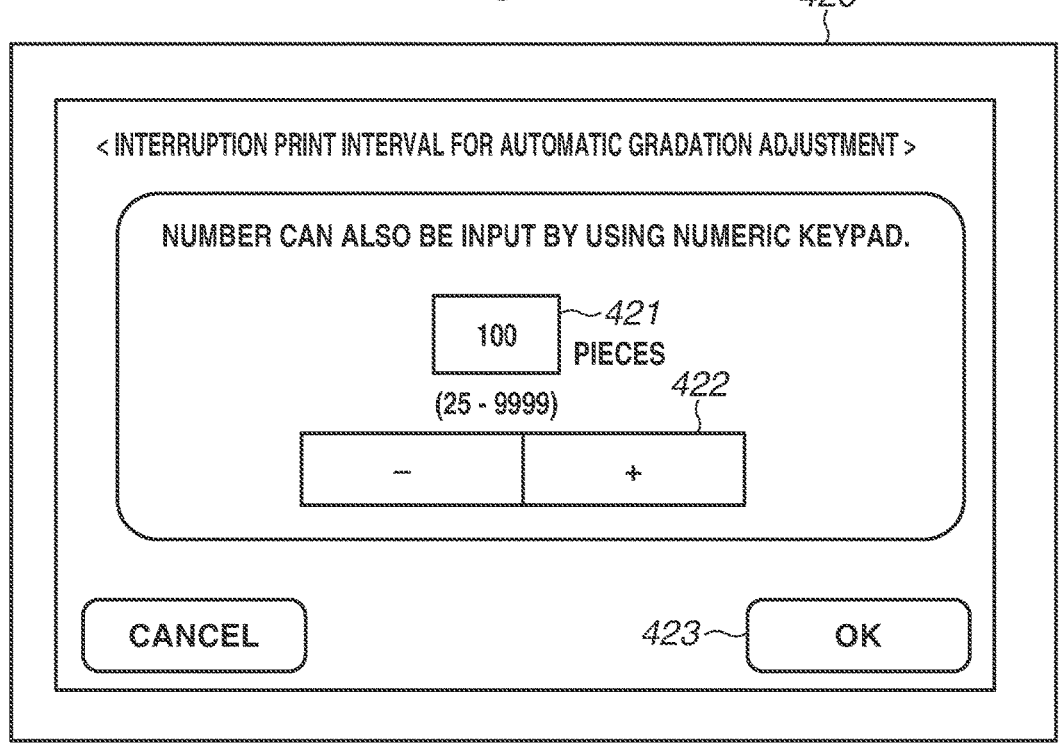

FIG. 4B is a diagram illustrating an example of a setting screen displayed on the operation unit 206 of the printing apparatus 101. In a case where the "gradation" and the "chart insertion type" are respectively selected in the adjustment item setting field 407 and the adjustment method setting field 408 in FIG. 4A, and a print request is transmitted to the printing apparatus 101, the CPU 201 of the printing apparatus 101 displays a setting screen 420 illustrated in FIG. 4B. The setting screen 420 is used to set a chart insertion interval in a case where the chart insertion type of real-time multi-gradation correction function is performed. The user operates an icon 422 or a numeric keypad (not illustrated) to set the number of discharged pages 421. When an OK button 423 is pressed, the CPU 201 of the printing apparatus 101 stores the set number of pages 421 as the chart insertion interval in the storage 204. As a result, the printing apparatus 101 performs the interruption processing of the correction job every time the number of discharged pages reaches the chart insertion interval.

Figure 5A:
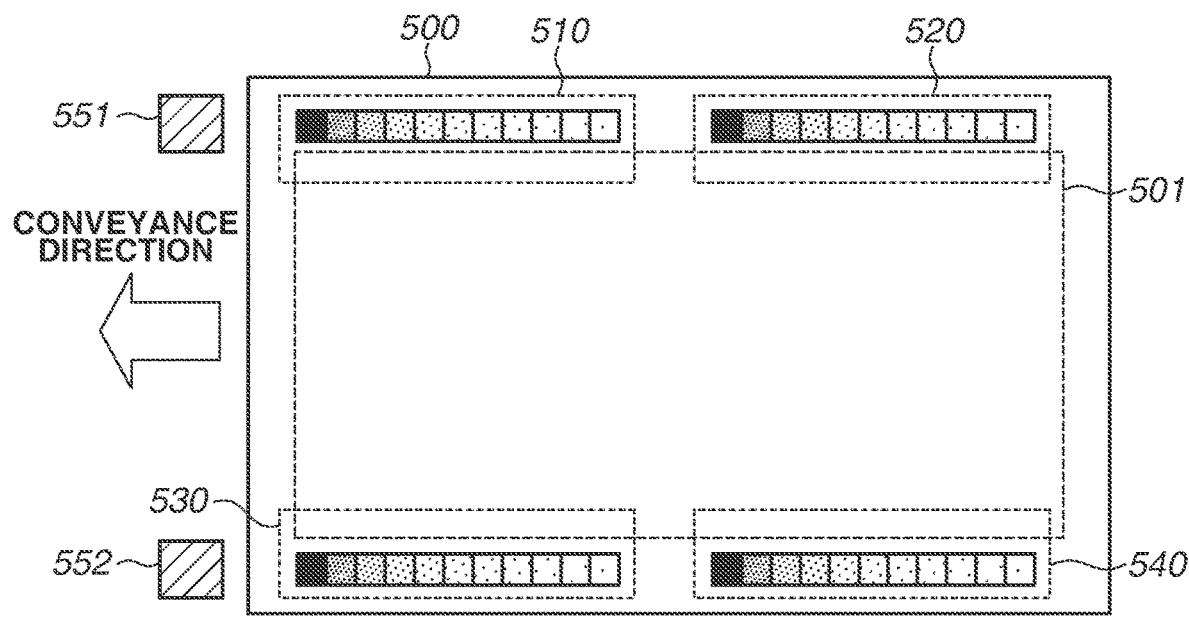
FIG. 5A is a diagram illustrating a positional relationship between gradation patches and a color measurement unit.

Next, a positional relationship between printing positions of the gradation patches and the color measurement unit 210 is described with reference to FIG. 5A and FIG. 5B. As illustrated in FIG. 5A, inline sensors 551 and 552 as the color measurement unit 210 are respectively disposed at right and left ends in the conveyance direction. Gradation patches 510, 520, 530, and 540 are printed at positions corresponding to reading positions of the inline sensors 551 and 552, on a sheet 500. More specifically, the gradation patches 510 to 540 of colors CMYK corresponding to developers 561 to 564 (FIG. 5B) of colors CMYK are printed in a margin area provided outside a print guaranteed area 501 of the sheet 500. Each of the gradation patches 510 to 540 includes ten patches with toner density of corresponding one of the colors CMYK from 10% to 100% at 10% intervals. The gradation patches 510 to 540 are each an example of the correction patch. In the case where the "chart insertion type" is selected, the gradation patches may be printed in the print guaranteed area 501. When the gradation patches are printed in the margin area, the "margin utilization type" and the "chart insertion type" can be switched as necessary while the reading positions of the inline sensors 551 and 552 are fixed.

Figure 5B:
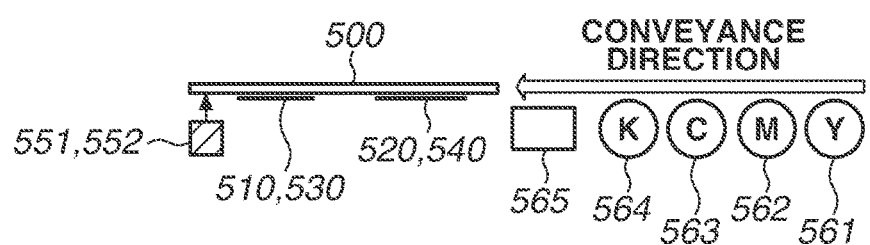
FIG. 5B is a diagram illustrating the positional relationship between the gradation patches and the color measurement unit.

FIG. 5B is a cross-sectional view illustrating the conveyance direction in the printing apparatus 101 when viewed from side. The printing apparatus 101 prints the gradation patches 510 to 540 on the sheet 500 by causing the developers 561 to 564 of the respective colors CMYK to transfer toner to the sheet 500 and causing a fixing device 565 to perform fixing processing to fix the toner to the sheet 500. Thereafter, the printing apparatus 101 controls the inline sensors 551 and 552 to acquire information on density of the colors CMYK as color measurement data from the gradation patches 510 to 540. The printing apparatus 101 performs the correction processing based on the color measurement data.

Next, data used for the correction processing performed by the printing apparatus 101 is described with reference to FIG. 5C, FIG. 5D, and FIG. 5E. FIG. 5C is a diagram illustrating examples of the reference value, the measurement value, and the correction value generated based on the color measurement data on the gradation patches. The printing apparatus 101 generates the reference value, the measurement value, and the correction value based on the color measurement data on the gradation patches 510 to 540 acquired by the inline sensors 551 and 552. As illustrated in FIG. 5C, each of a reference value 571, a measurement value 572, and a correction value 573 includes density information on ten patches for each of the colors CMYK, i.e., 40 patches in total. The density information is converted into numerical values in 1024 stages.

First, the printing apparatus 101 stores the acquired color measurement data as the reference value 571, and registers the reference value 571 in a reference value management table (FIG. 5D) in association with the sheet type. Next, in a case where the printing apparatus 101 acquires color measurement data about a sheet type, the reference value of which has not been registered, the printing apparatus 101 stores the color measurement data as a new reference value 571 and registers the reference value 571 in the reference value management table. In contrast, in a case where the printing apparatus 101 acquires the color measurement data about a sheet type, the reference value of which has been registered, the printing apparatus 101 handles the color measurement data as the measurement value 572, and calculates the correction value 573 by using a difference between the reference value 571 corresponding to the sheet type and the measurement value 572. Furthermore, the printing apparatus 101 stores the calculated correction vale 573, and registers the correction value 573 in a correction value management table (FIG. 5E) in association with the sheet type. In the present exemplary embodiment, the printing apparatus 101 stores the correction value 573; however, the printing apparatus 101 may store the measurement value 572 in place of the correction value 573, and may calculate the correction value 573 from the difference between the reference value 571 and the measurement value 572 in execution of the correction processing.

FIG. 5D is a diagram illustrating an example of the reference value management table. Records registered in the reference value management table include a sheet type 581, a target sheet feeding cassette 582, a reference value (½-speed) 583, a reference value (1/1-speed) 584, a generation page identification (ID) 585, and a timestamp 586. The sheet type 581 is information about the sheet type used in acquisition of the reference value. The target sheet feeding cassette 582 is information about the sheet feeding cassette used in acquisition of the reference value. The reference value (½-speed) 583 and the reference value (1/1-speed) 584 are information representing presence/absence of the reference value and a reference destination of the reference value. The 1/1-speed and the ½-speed each indicate an image forming speed. In other words, the printing apparatus 101 may perform correction processing different for each image forming speed. The generation page ID 585 is information for identification of a chart used in acquisition of the reference value. In this example, an accumulated value indicating the number of pages discharged after the printing apparatus 101 is turned on until the chart is inserted is used as the generation page ID 585. The timestamp 586 is information about date and time when the printing apparatus 101 is turned on.

FIG. 5D illustrates an example in which the reference value (TBL 571) that is obtained by feeding a "regular paper 3" from a "sheet feeding cassette 1 (CST1)" at "1/1-speed" in the print processing on the "60014"-th page after the printing apparatus 101 is turned on at "2019/07/18 10:04:06" has been registered. In a case where the "regular paper 3" is removed from the "sheet feeding cassette 1 (CST1)", the printing apparatus 101 deletes a record including the "regular paper 3" from the reference value management table. The printing apparatus 101 also deletes the reference value in the reference destination designated by the record.

FIG. 5E is a diagram illustrating an example of the correction value management table. Records registered in the correction value management table includes a sheet type 591, a target sheet feeding cassette 592, a correction value (½-speed) 593, a correction value (1/1-speed) 594, a generation page ID 595, and a timestamp 596. The correction value management table is similar to the reference value management table in FIG. 5D except that the reference value (½-speed) 583 and the reference value (1/1-speed) 584 are respectively replaced with the correction value (½-speed) 593 and the correction value (1/1-speed) 594. Thus, repetitive descriptions are omitted.

FIG. 5E illustrates an example in which the correction value (TBL 573) that is obtained by feeding a "regular paper 3" from a "sheet feeding cassette 1 (CST1)" at "1/1-speed" in the print processing on the "640015"-th page after the printing apparatus 101 is turned on at "2019/07/18 18:34:21" has been registered.

Next, a sheet replacement processing to replace sheets set in the sheet feeding cassette is described with reference to FIG. 6 to FIG. 8. FIG. 6 is a flowchart illustrating the sheet change processing. The processing in the flowchart of FIG. 6 is realized when the CPU 201 of the printing apparatus 101 reads out programs stored in the ROM 202 into the RAM 203 and executes the programs.

Figure 7A:
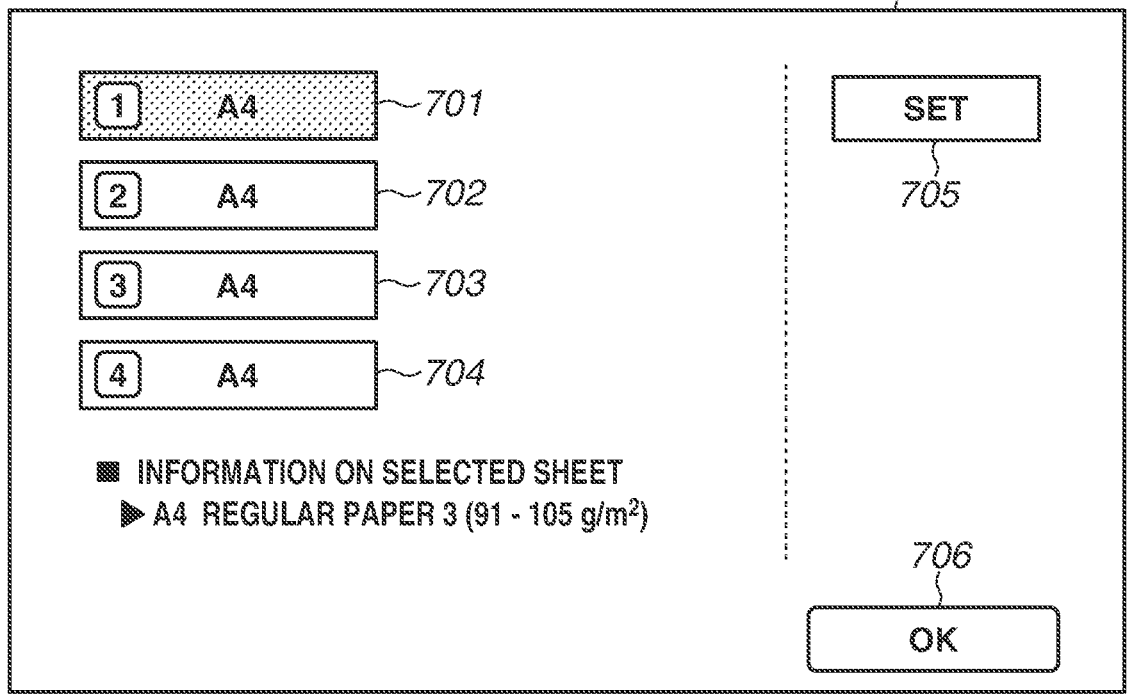
FIGS. 7A and 7B are diagrams each illustrating an example of a setting screen.

First, in step S601, the CPU 201 receives a request to display a setting screen for setting of sheets set in the sheet feeding cassette by user operation. FIG. 7A is a diagram illustrating an example of the setting screen.

Next, in step S602, the CPU 201 reads out and acquires setting information on sheet sizes and sheet types set in the sheet feeding cassettes of the printing apparatus 101, from the storage 204.

Next, in step S603, the CPU 201 displays the setting screen in which the information acquired in step S602 is reflected, on the operation unit 206. In a setting screen 700 of FIG. 7A, sheet sizes are displayed in selection buttons 701 to 704 assigned with the respective sheet feeding cassettes. In the example of FIG. 7A, a sheet feeding cassette 1 is selected, and a sheet type set in the sheet feeding cassette 1 is displayed.

Figure 7B:
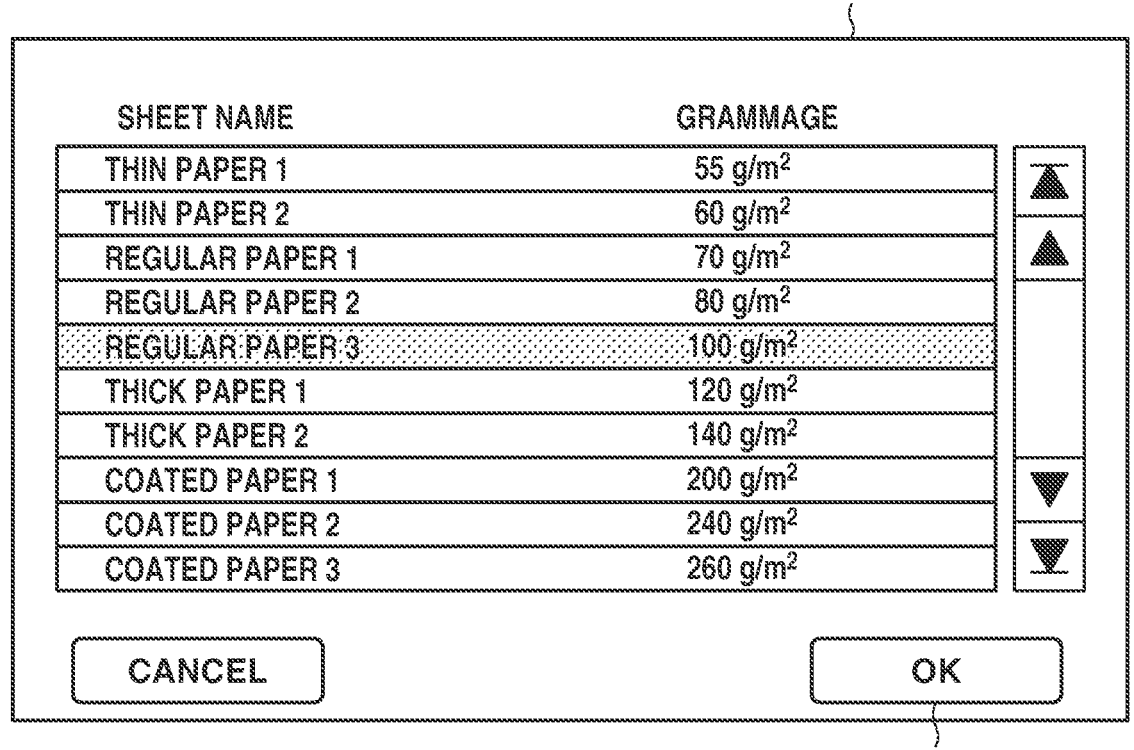

Next, in step S604, a selection button of the sheet feeding cassette in which sheets are to be changed is selected, and a set button 705 and then an OK button 706 are pressed. In step S605, the CPU 201 displays a sheet type setting screen on the operation unit 206. FIG. 7B is a diagram illustrating an example of the sheet type setting screen. In a setting screen 710 of FIG. 7B, a list of settable sheet types is displayed. After a sheet type (in this example, regular paper 3) to be set in the sheet feeding cassette selected in step S604 is selected and an OK button 708 is pressed, then in step S606, the CPU 201 performs processing to delete the reference value and the correction value of the sheet type to be removed for sheet replacement.

Next, detail of the processing in step S606 is described with reference to a flowchart of FIG. 8.

Figure 8:
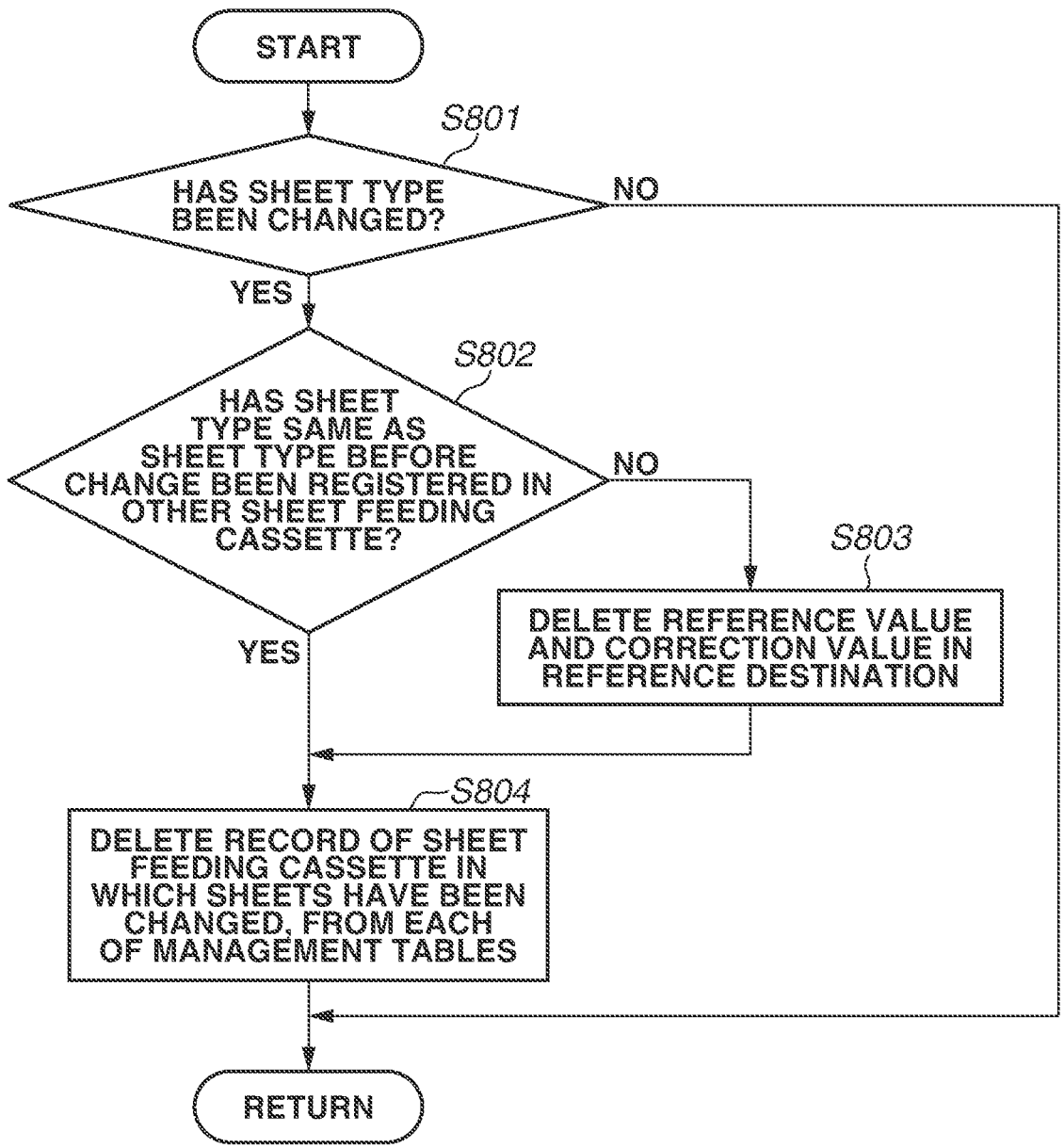
FIG. 8 is a flowchart illustrating detail of reference value/correction value deletion processing.

FIG. 8 is a flowchart illustrating detail of the processing to delete the reference value and the correction value.

First, in step S801, the CPU 201 determines whether the sheet type in the record of the selected sheet feeding cassette has been changed by referring to the records registered in the reference value management table and the correction value management table.

In a case where the CPU 201 determines that the sheet type has not been changed (i.e., the same sheet type has been set again) (NO in step S801), the processing returns to the flowchart of FIG. 6. In contrast, in a case where the CPU 201 determines that the sheet type has been changed (YES in step S801), the processing proceeds to step S802.

In step S802, the CPU 201 determines whether a sheet type same as the sheet type before the change has been registered in the other sheet feeding cassettes. In a case where the CPU 201 determines that the sheet type same as the sheet type before the change has not been registered in any of the other sheet feeding cassettes (NO in step S802), the processing proceeds to step S803.

In step S803, the CPU 201 deletes the reference value and the correction value for the sheet type before the change from the reference information storage unit 311 and the correction information storage unit 310. The processing then proceeds to step S804. In contrast, in a case where the CPU 201 determines in step S802 that the sheet type same as the sheet type before the change has been registered in the other sheet feeding cassettes (YES in step S802), the processing proceeds to step S804 without delating the reference value and the correction value for the sheet type.

In step S804, the CPU 201 deletes the records of the selected sheet feeding cassette from each of the reference value management table and the correction value management table. Thereafter, the processing proceeds to step S607 of FIG. 6.

In step S607, the CPU 201 displays the setting screen reflecting the sheet type after the change, on the operation unit 206. The series of processing in the flowchart the ends.

According to the processing in the flowchart as described above, it is possible to appropriately manage the correspondence relationship between the sheet feeding cassettes and the sheet types, and the reference value and the correction value for each of the sheet types.

Figure 9:
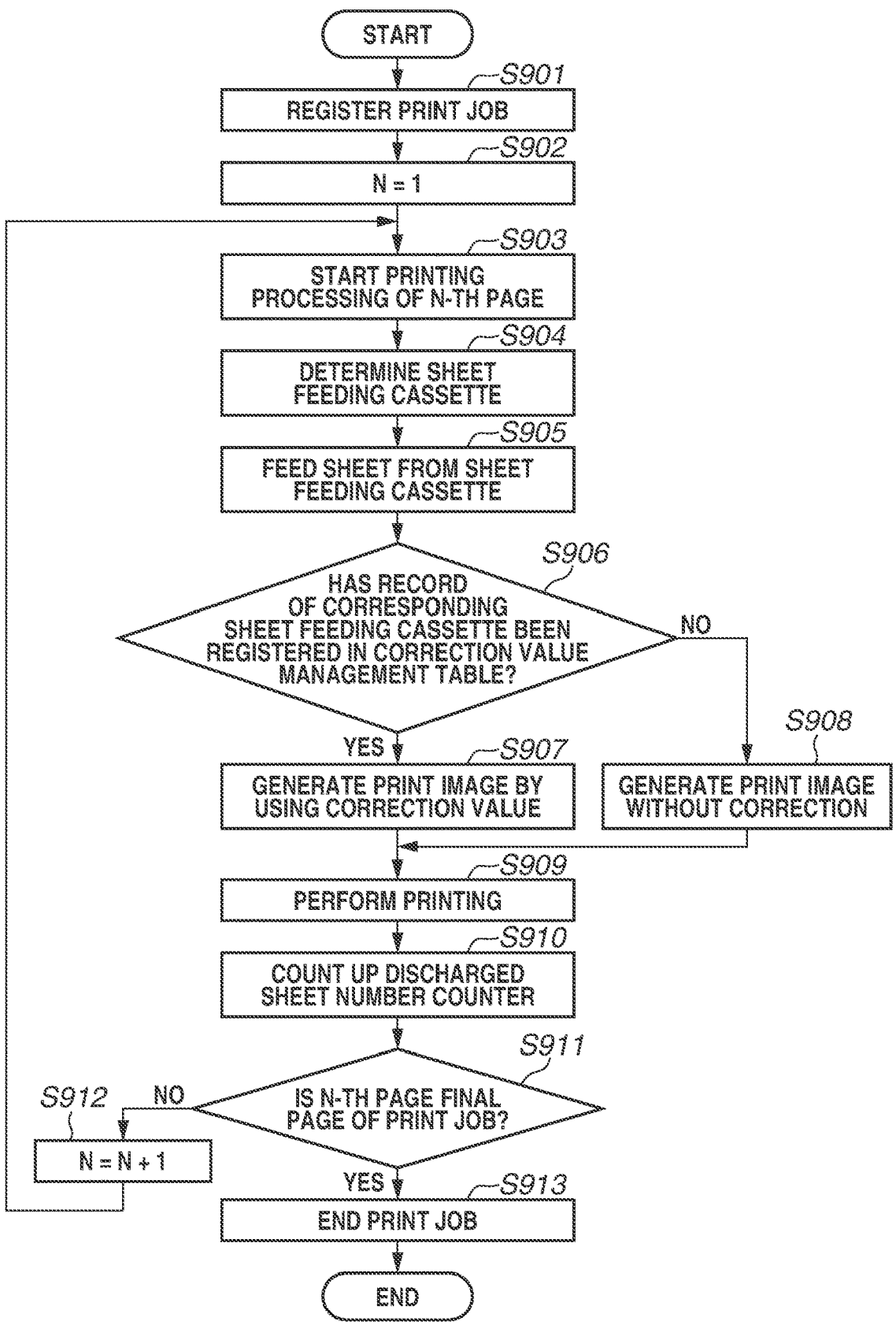
FIG. 9 is a flowchart illustrating print job execution processing.

Subsequently, the processing performed in execution of the print job is described with reference to FIG. 9 to FIG. 11. FIG. 9 is a flowchart illustrating print job execution processing. The processing in the flowchart of FIG. 9 is realized when the CPU 201 of the printing apparatus 101 reads out programs stored in the ROM 202 into the RAM 203 and executes the programs. The processing in the flowchart of FIG. 9 is started when the printing apparatus 101 receives a print request (print data) from the information processing apparatus 102.

First, in step S901, the CPU 201 generates and registers a print job to print the received print data.

Next, in step S902, when the CPU 201 starts execution of the print job registered in step S901, the CPU 201 sets one to a value N that holds the number of pages of the print job.

Next, in step S903, the CPU 201 instructs each of the units to start print processing on the N-th page.

Next, in step S904, the CPU 201 determines the sheet feeding cassette from which a sheet is to be fed, based on the sheet size and the sheet type (hereinafter, referred to as sheet information) designated for the N-th page of the print job.

Next, in step S905, the CPU 201 feeds a sheet from the sheet feeding cassette determined in step S904 and stores the sheet information and information on the sheet feeding cassette used for feeding the sheet, in the RAM 203. In other words, the CPU 201 functions as a holding unit holding information on the sheet feeding cassette used for the page in the print processing. The sheet information and the information on the sheet feeding cassette stored in the RAM 203 are updated each time the page print processing is performed.

Next, in step S906, the CPU 201 determines whether the record of the sheet feeding cassette used for the sheet feeding has been registered, by referring to the target sheet feeding cassette 592 in the correction value management table. In a case where the CPU 201 determines that the record has been registered (YES in step S906), the processing proceeds to step S907.

In step S907, the CPU 201 reads out the correction value from the correction information storage unit 310 by using the registered record. In a case where two or more records have been registered, the CPU 201 reads out the correction value of the latest record by referring to the generation page ID 585 in the correction value management table. The CPU 201 generates a print image in which the read correction value is reflected on image data on the N-th page. The processing then proceeds to step S909.

In contrast, in a case where the CPU 201 determines in step S906 that the record has not been registered (NO in step S906), the processing proceed to step S908. In step S908, the CPU 201 generates a print image without correction. The processing then proceeds to step S909.

In step S909, the CPU 201 prints the print image generated in step S908 on the sheet fed in step S905. Since the "chart insertion type" is selected in the present exemplary embodiment, the gradation patches are not combined with the print image.

Next, in step S910, the CPU 201 counts up a discharged sheet number counter holding the accumulated value indicating the number of discharged pages, and stores the value of the counter in the RAM 203. The print processing of the N-th page then ends.

Next, in step S911, the CPU 201 determines whether the N-th page is a final page of the print job. In a case where the CPU 201 determines that the N-th page is not a final page (NO in step S911), the processing proceeds to step S912. In step S912, the value N is counted up and stored in the RAM 203, and the processing returns to step S903. In contrast, in a case where the CPU 201 determines in step S911 that the N-th page is a final page (YES in step S911), the processing proceeds to step S913. In step S913, the print job ends. The series of processing in the flowcharts then ends.

During execution of the print job described above, the interruption processing of the correction job described next is performed at a predetermined interval. As a result, the correction value generated in the correction job is reflected on the image generated in the print job after the interruption processing, and the correction result can be continuously fed back to the subsequent pages. In other words, gradation variation in the print job is reduced.

Figure 10:
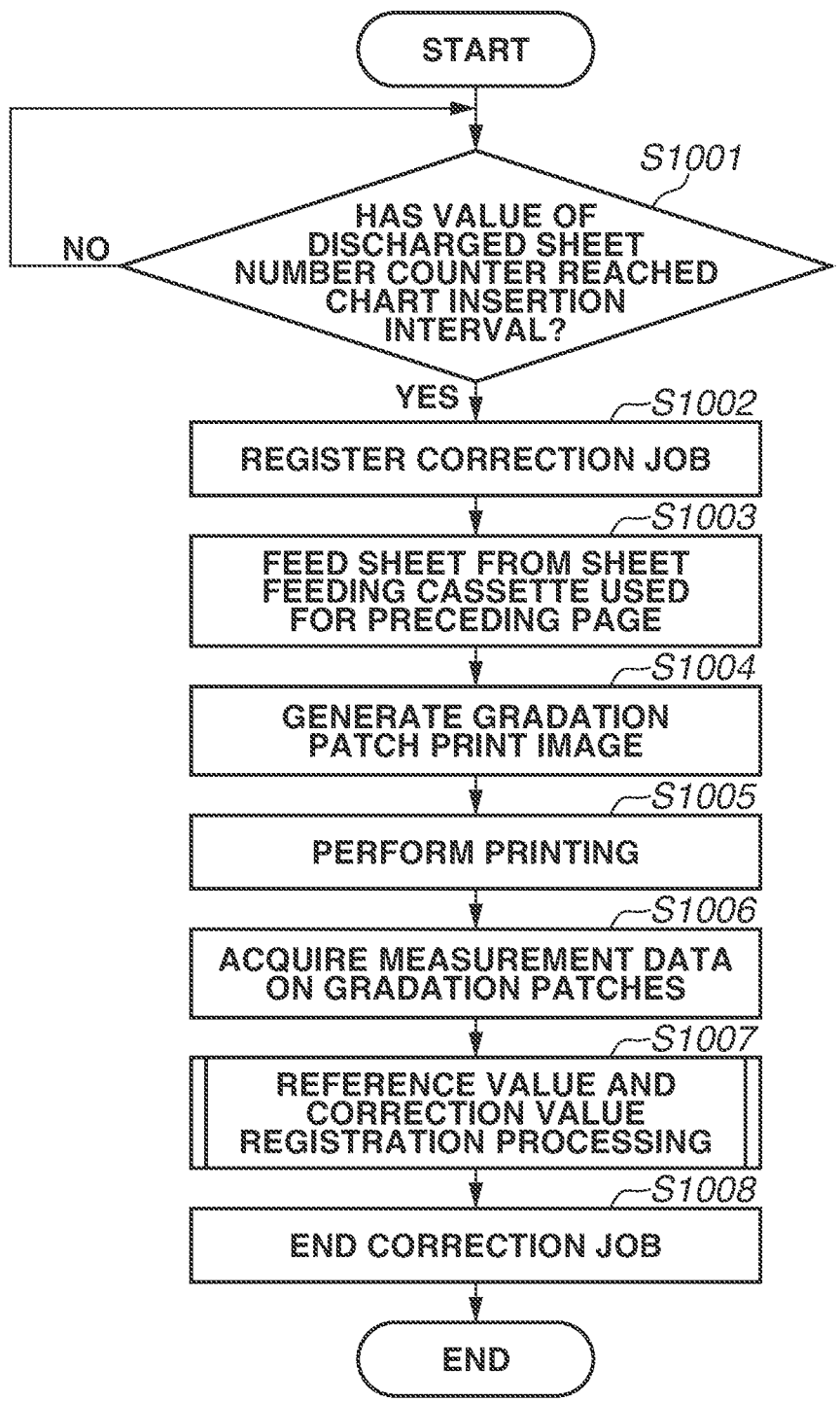
FIG. 10 is a flowchart illustrating correction job execution processing according to a first exemplary embodiment.

FIG. 10 is a flowchart illustrating correction job execution processing. The processing in the flowchart of FIG. 10 is realized when the CPU 201 of the printing apparatus 101 reads out programs stored in the ROM 202 into the RAM 203 and executes the programs. The processing in the flowchart of FIG. 10 is started when a print job is registered.

First, in step S1001, the CPU 201 determines whether the value of the discharged sheet number counter has reached the preset chart insertion interval (illustrated in FIG. 4B) each time the page print processing is completed. The processing waits until the CPU 201 determines that the value of the discharged sheet number counter has reached the preset chart insertion interval (NO in step S1001). In a case where the CPU 201 determines that the value of the discharged sheet number counter has reached the preset chart insertion interval (YES in step S1001), the processing proceeds to step S1002.

In the present exemplary embodiment, the interruption processing is performed when the number of discharged pages has reached the set value as a trigger; however, the condition for executing the interruption processing is not limited thereto, and other conditions such as lapse of a predetermined time after a start of the printing may be also used as the trigger.

In step S1002, the CPU 201 performs processing (interruption processing) to interrupt the print job under execution and to generate and register a correction job to print the gradation patches. The CPU 201 functions as a control unit controlling execution of the interruption processing of the correction job.

Next, in step S1003, the CPU 201 reads out information on the current sheet feeding cassette from the RAM 203. The CPU 201 determines the sheet feeding cassette from which a sheet is to be fed, based on the read information on the sheet feeding cassette, and feeds a sheet from the determined sheet feeding cassette. More specifically, the sheet is fed from the sheet feeding cassette designated by the read information on the sheet feeding cassette. In other words, the CPU 201 feeds a sheet from the sheet feeding cassette same as the sheet feeding cassette used in the print processing on the page immediately before the interruption processing.

Next, in step S1004, the CPU 201 reads out the current sheet information from the RAM 203, and generates a gradation patch print image based on the read sheet information.

Next, in step S1005, the CPU 201 prints the print image generated in step S1004 on the sheet fed in step S1003.

After the printing is completed, then in step S1006, the CPU 201 causes the color measurement unit 210 to measure colors of the gradation patches on the sheet, and acquires color measurement data from the color measurement unit 210.

Next, in step S1007, the CPU 201 performs processing to register a reference value and a correction value generated using the color measurement data. Detail of the processing in step S1007 is described below with reference to FIG. 11.

Next, in step S1008, the CPU 201 ends the correction job. The CPU 201 thereafter resumes execution of the print job.

According to the processing in the flowchart of FIG. 10 as described above, the printing apparatus 101 feeds a sheet to be used for the correction job from the sheet feeding cassette used in the print processing on the page immediately before the interruption processing. This makes it possible to print the gradation patches without changing the sheet feeding cassette, the printing condition, etc., and continuity of the processing is not impeded. The sheet feeding cassette from which the sheet used for the correction job is fed is not necessarily the sheet feeding cassette used for printing of the page immediately before the interruption processing, and may be a sheet feeding cassette used for printing of the other pages as long as the sheet feeding cassette is used for printing of a page included in the print job. For example, a sheet feeding cassette used for printing of a page immediately after the interruption processing may be used. In this case, the printing apparatus 101 analyzes the print job and acquires information on the sheet feeding cassette.

Subsequently, the detail of the processing in step S1007 is described with reference to a flowchart of FIG. 11.

Figure 11:
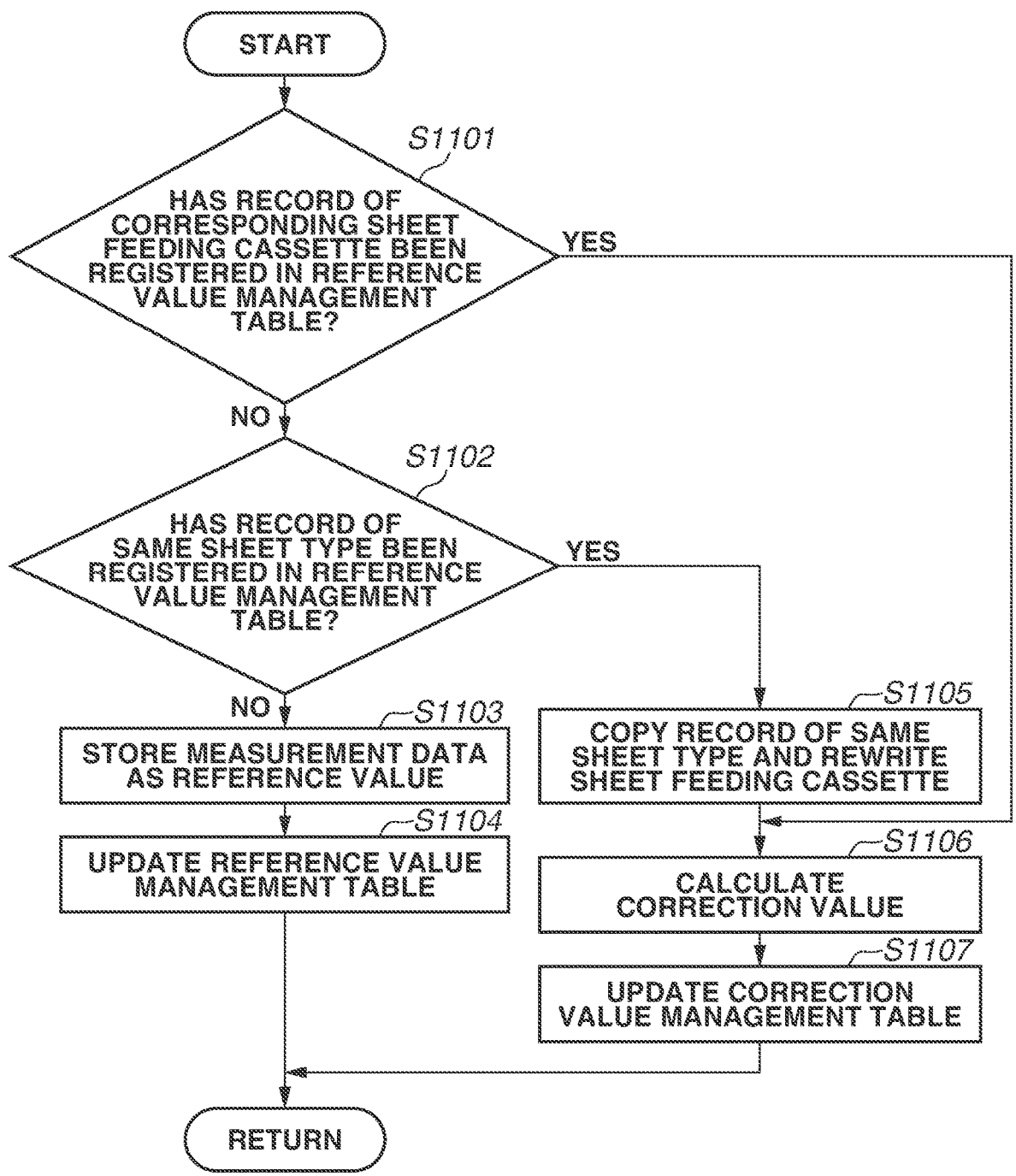
FIG. 11 is a flowchart illustrating detail of reference value/correction value registration processing.

FIG. 11 is a flowchart illustrating the detail of the processing to register the reference value and the correction value.

First, in step S1101, the CPU 201 determines whether a record of the sheet feeding cassette used in step S1003 has been registered, by referring to the target sheet feeding cassette 582 in the reference value management table. In a case where the CPU 201 determines that the record has been registered (YES in step S1101), the CPU 201 reads out the reference value from the reference information storage unit 311 by using the record. The processing then proceeds to step S1106. In contrast, in a case where the CPU 201 determines in step S1101 that the record has not been registered (NO in step S1101), the processing proceeds to step S1102.

In step S1102, the CPU 201 determines whether a record of the sheet type used in step S1004 has been registered, by referring to the sheet type 581 in the reference value management table. In a case where the CPU 201 determines that the record has not been registered (NO in step S1102), the processing proceeds to step S1103.

In step S1103, the CPU 201 stores the color measurement data acquired in step S1006 as the reference value in the reference information storage unit 311. Next, in step S1104, the CPU 201 performs link processing to add the record to the reference value management table and to refer to the reference value stored in step S1103. As a result, the new reference value is stored in association with the sheet type. The processing then returns to the flowchart of FIG. 10.

In contrast, in a case where the CPU 201 determines in step S1102 that the record has been registered (YES in step S1102), the processing proceeds to step S1105. In step S1105, the CPU 201 copies the registered record and adds the record to the reference value management table, and rewrites the information in the target sheet feeding cassette 582 with information on the sheet feeding cassette used in step S1003. As a result, the reference value of the sheet type used in step S1004 is associated with the sheet feeding cassette used in step S1003. Furthermore, the CPU 201 reads out the reference value from the reference information storage unit 311 by using the added record.

In step S1106, the CPU 201 calculates a correction value from a difference between the color measurement data acquired in step S1006 as a measurement value, and the read reference value.

Next, in step S1107, the CPU 201 stores the calculated correction value in the correction information storage unit 310. The CPU 201 further performs link processing to add the record to the correction value management table and to refer to the stored correction value. As a result, the correction value is stored in association with the sheet type. The processing then returns to the flowchart of FIG. 10.

According to the processing in the flowchart of FIG. 11 as described above, it is possible to rapidly specify the reference value to be referred to by using the correspondence relationship between the sheet feeding cassette and the sheet type. Furthermore, even in a case where the sheet type is not associated with the sheet feeding cassette, it is possible to specify the reference value to be referred to if the sheet type same as the sheet type used for the correction job is registered in the other sheet feeding cassettes.

In the printing apparatus 101 according to the first exemplary embodiment as described above, the correction job is executed at the predetermined interval during execution of the print job, and the density can be adjusted. This reduced gradation variation in the print job. Further, since the sheet to be used for the correction job is fed from the sheet feeding cassette used for printing of the page immediately before the correction job, continuity of the processing is not impeded. Furthermore, since the correction processing corresponding to the sheet type used for the print job is performed, quality of an output product is secured.

In the first exemplary embodiment above described, the description has been given of the form in which the printing apparatus 101 prints the gradation patches on the sheet fed from the sheet feeding cassette used for the page printed immediately before the interruption processing. In such a form, in a case of a print job including pages different in sheet type, the gradation patches may not be printed on some types of sheets. Therefore, in a second exemplary embodiment, a description is given of a form in which, in a case where the print job includes pages different in sheet type, the gradation patches are printed on a plurality of types of sheets. In the following description, functional configurations similar to the functional configurations of the first exemplary embodiment are denoted by the same reference numerals, and repetitive descriptions of the functional configurations are omitted. Differences from the first exemplary embodiment are mainly described.

Figure 12:
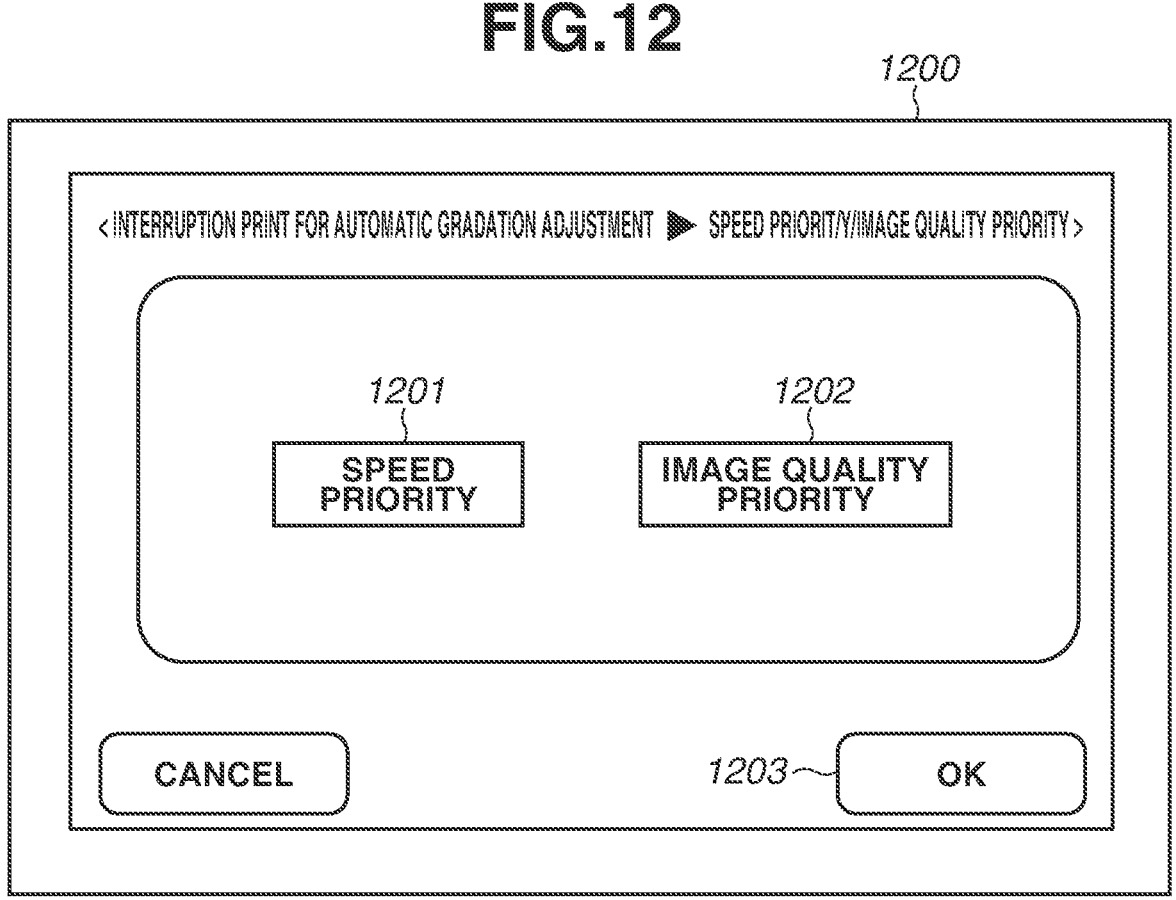
FIG. 12 is a diagram illustrating an example of a mode setting screen.

FIG. 12 is a diagram illustrating an example of a mode setting screen. The CPU 201 of the printing apparatus 101 displays a mode setting screen 1200 illustrated in FIG. 12 on the operation unit 206 in response to a request to display a setting screen for setting a mode, by the user operation. In the mode setting screen 1200, a selection button 1201 for a speed priority mode and a selection button 1202 for an image quality priority mode are displayed. The speed priority mode is a mode (first mode) in which the correction job is performed by using the sheet fed from the sheet feeding cassette used for the page printed immediately before the interruption processing, as described with reference to the flowchart of FIG. 10. The image quality priority mode is a mode (second mode) in which the correction job is performed by using all of the types of sheets used in the print processing performed between the chart insertion intervals. When either of the selection buttons 1201 and 1202 is selected, and an OK button 1203 on the mode setting screen 1200 is pressed, the printing apparatus 101 sets the selected mode. In other words, the CPU 201 of the printing apparatus 101 function as a setting unit setting either of the speed priority mode and the image quality priority mode. When execution of the print job is started, the printing apparatus 101 performs either of the processing in the flowchart of FIG. 10 and the processing in a flowchart of FIG. 14 described below, based on the set mode.

FIG. 13 is a diagram illustrating an example of a registration list used in the image quality priority mode. As illustrated in FIG. 13, combinations of the information on the sheet feeding cassette and the sheet information are recorded in the registration list. In the example of FIG. 13, a combination of the "sheet feeding cassette 1 (CST1)" and the "regular sheet 3" and a combination of a "sheet feeding cassette 4 (CST4)" and a "coated sheet 1" are recorded. The printing apparatus 101 stores the registration list in the RAM 203 or the like, and initializes the registration list at the start of execution of the print job or in execution of the interruption processing. When execution of the print job is started or resumed, the printing apparatus 101 records a combination of the information on the sheet feeding cassette and the sheet information in the registration list each time the printing apparatus 101 performs the page print processing. In this case, when the same combination of the information on the sheet feeding cassette and the sheet information has been already recorded, the printing apparatus 101 does not record the combination. As a result, all of the information on the sheet feeding cassettes and the sheet information used in the print processing performed between the chart insertion intervals (after the start of execution of the print job or the time of execution of the previous interruption processing until the time of execution of current interruption processing) are recorded in the registration list.

Figure 14:
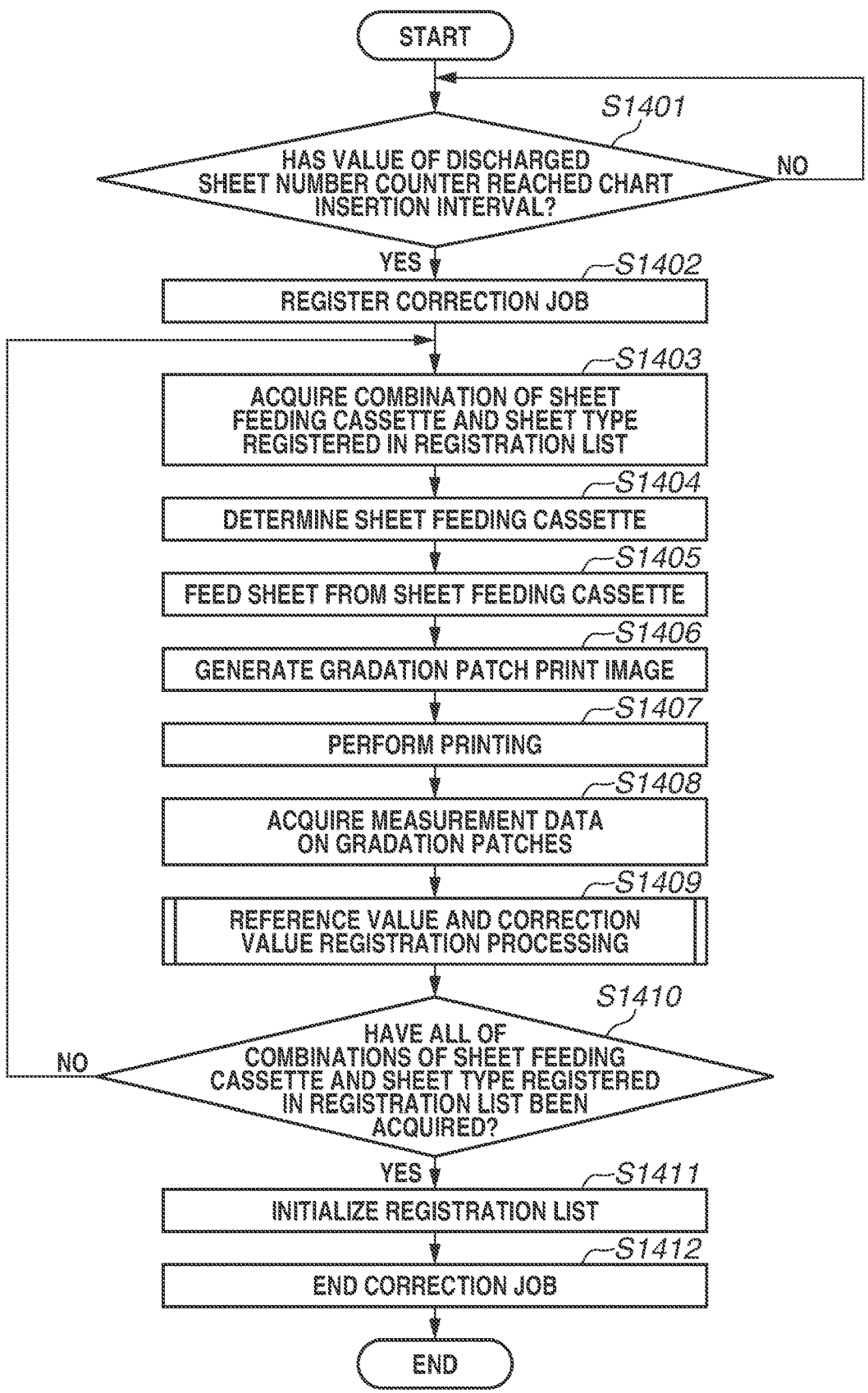
FIG. 14 is a flowchart illustrating correction job execution processing according to a second exemplary embodiment.

FIG. 14 is a flowchart illustrating correction job execution processing. The processing in the flowchart of FIG. 14 is realized when the CPU 201 of the printing apparatus 101 reads out programs stored in the ROM 202 into the RAM 203 and executes the programs. The flowchart of FIG. 14 is different from the flowchart of FIG. 10 in that processing in steps S1403 to S1405 is performed in place of the processing in step S1003, and processing in steps S1410 and S1411 is performed between the processing in steps S1007 and S1008. In the following, differences are mainly described, and description of similar processing is omitted.

Processing in steps S1401 and S1402 are similar to the processing in steps S1001 and S1002.

In step S1403, the CPU 201 refers to the registration list, and acquires a combination of the information on the sheet feeding cassette and the sheet information recorded at the head of the registration list.

Next, in step S1404, the CPU 201 determines the sheet feeding cassette from which a sheet is to be fed, based on the acquired information on the sheet feeding cassette, in a manner similar to step S1003.

Next, in step S1405, the CPU 201 feeds a sheet from the determined sheet feeding cassette.

Next, in step S1406, the CPU 201 generates a gradation patch print image based on the sheet information acquired in step S1403, in a manner similar to step S1004.

Processing in steps S1407 to S1409 are similar to the processing in steps S1005 to S1007.

In step S1410, the CPU 201 determines whether all of combinations of the information on the sheet feeding cassette and the sheet information recorded in the registration list have been acquired. In a case where the CPU 201 determines that all of the combinations have been acquired (YES in step S1410), the processing proceeds to step S1411. In contrast, in a case where the CPU 201 determines that there is a combination that has not been acquired yet (NO in step S1410), the processing returns to step S1403. The CPU 201 repeats the processing in steps S1403 to S1409 until all of the combinations of the information on the sheet feeding cassette and the sheet information are acquired. As a result, the correction values for all of the sheet types used in the print processing performed between the chart insertion intervals can be generated.

In step S1411, the CPU 201 initializes the registration list. As a result, the information registered in the registration list before execution of the current interruption processing is cleared, and preparation for registration of information used in the print processing performed until execution of the next interruption processing is completed.

Next, in step S1412, the CPU 201 ends the correction job. The CPU 201 then resumes execution of the print job.

In the printing apparatus 101 according to the second exemplary embodiment as described above, in the case where the print job includes pages different in sheet type, it is possible to perform density adjustment on the plurality of types of sheets used in the print processing performed between the predetermined intervals. This reduces gradation variation in the print job. Furthermore, since the gradation patches are printed on only the sheet types used in the printing performed between the predetermined intervals, it is possible to reduce deterioration of performance as much as possible. Moreover, since the correction processing corresponding to the sheet type is performed without omission, it is possible to provide a high quality output product to the user.

According to the exemplary embodiments of the present disclosure, it is possible to secure quality of the output product of the image forming apparatus while reducing deterioration of productivity.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-175296, filed Oct. 19, 2020, which is hereby incorporated by reference herein in its entirety.

What is claimed is:

1. An image forming apparatus including a plurality of sheet feeding cassettes configured to contain sheets, the image forming apparatus comprising:
one or more controllers including one or more processors and one or more memories, the one or more controllers being configured to perform operations including:

obtaining color measurement data of an image printed on a sheet, performing control, in a case where a predetermined condition is satisfied during execution of a print job to print image data, to execute interruption processing of a correction job to print a correction patch, and performing correction processing on an image data based on the obtained color measurement data on the correction patch, wherein, in a case where the correction patch is to be printed on a sheet, performing control includes causing the sheet on which the correction patch is to be printed to be fed from, among the plurality of sheet feeding cassettes, a sheet feeding cassette that is the same as a sheet feeding cassette used for printing a page immediately before the interruption processing.

2. The image forming apparatus according to claim 1, wherein the operations further include storing information on the sheet feeding cassette used for the printing of a page included in the print job, wherein performing control includes determining the sheet feeding cassette to be used for the correction job based on the information on the stored sheet feeding cassette stored.

3. The image forming apparatus according to claim 1, wherein performing control includes determining the sheet feeding cassette to be used for the correction job based on information on a sheet feeding cassette used for a page printed after a start of execution of the print job or execution of the interruption processing until execution of current interruption processing.

4. The image forming apparatus according to claim 1, wherein the operations further include setting any of a first mode and second mode, wherein the first mode is a mode in which the sheet feeding cassette to be used for the correction job is determined based on information on the sheet feeding cassette used for the printing of the page immediately before the interruption processing, and wherein the second mode is a mode in which the sheet feeding cassette to be used for the correction job is determined based on information on the sheet feeding cassette used for a page printed after a start of execution of the print job or execution of the interruption processing until execution of current interruption processing.

5. The image forming apparatus according to claim 1, wherein the predetermined condition indicates that a number of discharged pages reaches a set value.

6. The image forming apparatus according to claim 1, wherein, after determining the sheet feeding cassette to be used for the correction job, performing control includes printing the correction patch on the correction patch sheet fed from the determined sheet feeding cassette.

7. The image forming apparatus according to claim 6, wherein performing control includes reflecting a result of the correction processing on the print job, and wherein the correction processing on the print job is resumed after the interruption processing of the correction job to print the correction patch is executed.

8. The image forming apparatus according to claim 6, wherein the operations further include holding a reference value for each sheet information, wherein performing control includes generating a correction value used for the correction processing based on the color measurement data on the correction patch and the reference value for the sheet information on the correction patch sheet on which the correction patch is printed.

9. The image forming apparatus according to claim 8, wherein holding includes holding a correspondence relationship between a sheet feeding cassette and sheet information, and wherein, based on the correspondence relationship, performing control includes specifying the reference value used for generation of the correction value from information on the sheet feeding cassette to be used for the correction job.

10. The image forming apparatus according to claim 6, wherein the operations further include holding a correction value for each sheet information, and wherein performing control includes performing the correction processing by using the correction value for the sheet information on the correction patch sheet on which the correction patch is printed.

11. The image forming apparatus according to claim 10, wherein holding includes holding a correspondence relationship between a sheet feeding cassette and sheet information, and wherein, based on the correspondence relationship, performing control includes specifying the reference value used for generation of the correction value from information on the sheet feeding cassette to be used for the correction job.

12. A method for an image forming apparatus including a plurality of sheet feeding cassettes configured to contain sheets, the method comprising:

measuring, as a color measurement, a color of an image printed on a sheet;

performing control, in a case where a predetermined condition is satisfied during execution of a print job to print image data, to execute interruption processing of a correction job to print a correction patch; and performing correction processing on an image data based on color measurement data on the correction patch obtained by measuring the color of the image printed on the sheet, wherein, in a case where the correction patch is to be printed on a sheet, performing control includes causing the sheet on which the correction patch is to be printed to be fed from, among the plurality of sheet feeding cassettes, a sheet feeding cassette that is the same as a sheet feeding cassette used for printing a page immediately before the interruption processing.

13. An image forming apparatus including a plurality of sheet feeding cassettes configured to contain sheets, the image forming apparatus comprising:

one or more controllers including one or more processors and one or more memories, the one or more controllers configured to:

executing a print job to print image data in a case where an image formation print request has been received, determining, during execution of the print job, whether a predetermined condition is satisfied, and executing, in a case where the predetermined condition is satisfied, interruption processing of a correction job to print a correction patch, wherein the interruption processing includes:

obtaining color measurement data of the correction patch image printed on a sheet, performing correction processing on an image data based on color measurement data on the correction patch obtained as the color measurement data, and causing, in a case where the correction patch is to be printed on a correction patch sheet, the correction patch sheet on which the correction patch is to be printed to be fed from, among the plurality of sheet feeding cassettes and without changing a printing condition, a sheet feeding cassette that is the same as a sheet feeding cassette that contained a sheet used for printing a page immediately before the interruption processing.

14. An image forming apparatus including a plurality of sheet feeding cassettes configured to contain sheets, the image forming apparatus comprising:

one or more controllers including one or more processors and one or more memories, the one or more controllers being configured to perform operations including:

executing a print job, performing processing to print images on a plurality of sheets in accordance with execution of the print job, setting an interruption print interval for gradation correction, inserting a sheet for printing an image for gradation correction between the plurality of sheets in accordance with the set interruption print interval, performing processing to print the image for gradation correction on the inserted sheet, performing processing to read the printed image for gradation correction, and performing gradation correction based on the read image for gradation correction, wherein a type of the sheet to be inserted is the same as a type of a sheet to be used for the print job for printing a page immediately before the insertion.

15. The image forming apparatus according to claim 14, wherein the image for gradation correction is an image including a plurality of densities of Cyan, Magenta, Yellow, or Black.

16. The image forming apparatus according to claim 14, wherein performing gradation correction includes performing gradation correction for a first color by using a plurality of images each including a plurality of densities of the first color.

17. The image forming apparatus according to claim 14, wherein inserting the sheet includes inserting the sheet from the sheet feeding cassette used for the page immediately before the insertion.

18. The image forming apparatus according to claim 14, wherein performing processing to print the image for gradation correction includes performing processing to print the image for gradation correction on the sheet fed from the sheet feeding cassette used for the page immediately before the insertion.

* * * * *